Feb. 16, 1965    L. B. GRIFFITH    3,169,921
POND WATER CIRCULATOR, AERATOR, AND FOAM FORMATION ELIMINATOR
Filed April 19, 1957
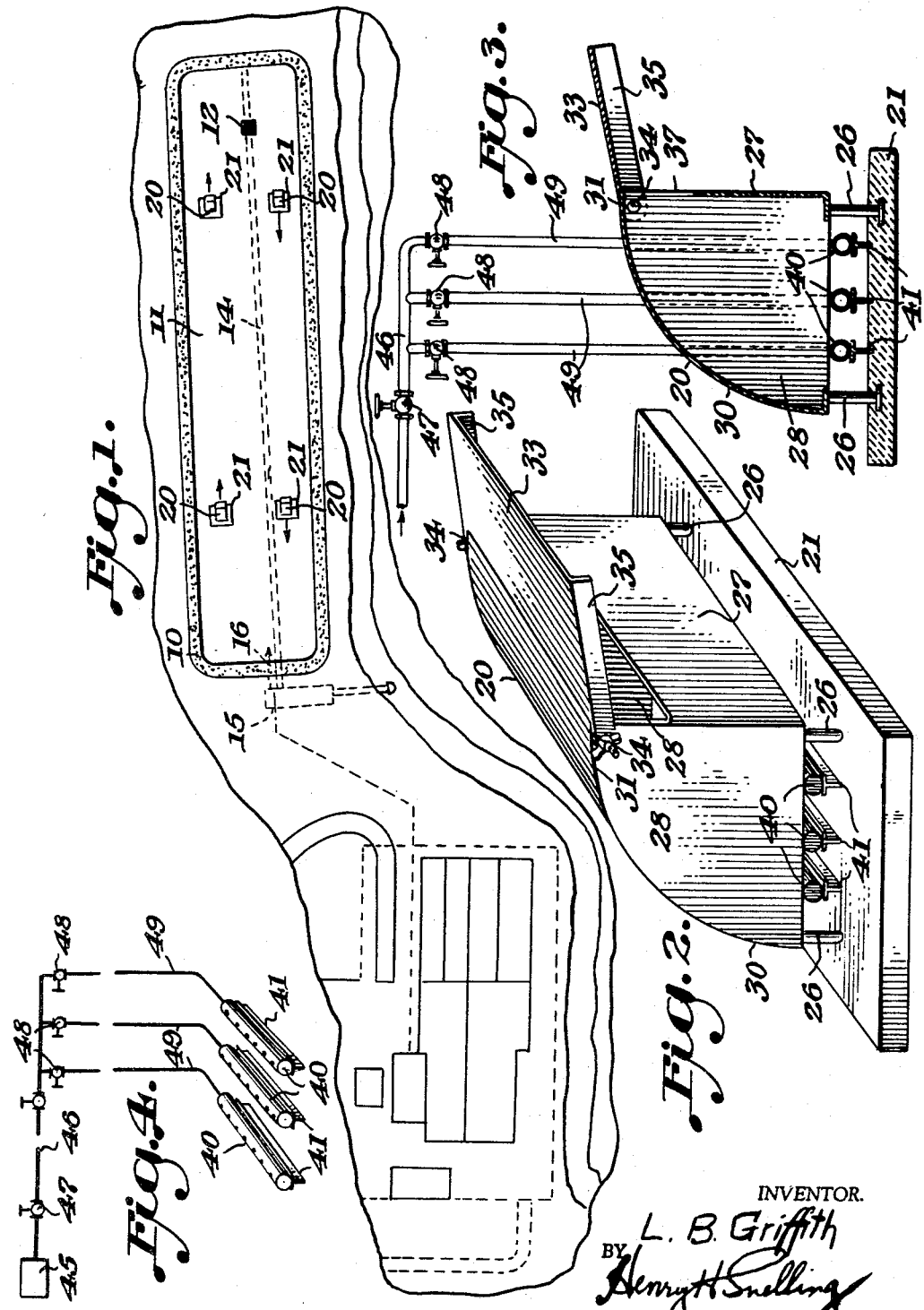
INVENTOR.
L. B. Griffith
BY Henry H. Snelling
ATTY.

United States Patent Office 3,169,921
Patented Feb. 16, 1965

3,169,921
POND WATER CIRCULATOR, AERATOR, AND
FOAM FORMATION ELIMINATOR
Llewellyn B. Griffith, 22 S. Edison St., Arlington, Va.
Filed Apr. 19, 1957, Ser. No. 653,797
3 Claims. (Cl. 210—170)

This invention relates to tertiary sewage treatment systems and has for its principal object the provision of means for circulating and aerating domestic sewage which has had primary and secondary treatment before being discharged into the aquatic pond for its final treatment. The bottom of the pond is kept free of the sludge which in lagoons has often used up the available oxygen at an excessive rate.

A prime object of the invention is to insure that the tertiary treatment pond shall be such an asset to the community that it may be located in a residential section where the animal and vegetable life in the pond and the absence of scum, sludge, odors, etc. make the pond a recreational area. This naturally requires that the primary and secondary units have adequate stand-by units and remove from 95% to 98% of the organic solids and satisfy the same percentage of the biological and chemical needs for oxygen. The effluent from the existing facilities which give what is technically known as "complete" treatment is made pathogenically pure by chlorination before being discharged into the tertiary treatment pond.

A further object of the invention is to provide means for preventing formation of the sticky foam seemingly due to the present day great use of detergents, this foam being sufficiently light to float like a cloud and when blown from a pond will adhere to objects of various kinds, trees for example. This foam is highly soluble in water if brought into intimate contact and this object of the invention includes providing such contact for a sufficient period of time to dissolve all of such foam as may be formed.

Another object of the invention is to deflect a moving body of water and air from a vertical to a horizontal flow and to move this body of water and air bubbles just beneath the liquid level of the pond at a speed sufficiently great that the foam is dissolved before leaving the deflecting guide whereupon the greater part of the air may enter the atmosphere as soon as the foam is completely in suspension.

A further object of the invention is to provide a plurality of aerators in a pond disposed in such fashion as to cause a closed circulating path near the margin of the pond, this path repeatedly removing liquid from the bottom of the pond and discharging it at or just below the surface of the pond, thus causing the bottom organic life to kill the algae at the top and thereby eliminate the green scum so often observed in aquatic ponds.

The combination of the several objects of the invention together makes for economical oxygenation of the pond with adequate recirculation, complete elimination of the danger of civil suits because of damage by air borne foam, and makes it possible to use the tertiary treatment pond as an esthetic asset to the community in which it is located as there are no odors. The pond is stocked with snails, bass, blue gills and with water liles and other forms of vegetation.

In the drawings:
FIGURE 1 is a plan view of a pond;
FIGURE 2 is a perspective view of one of the circulators;
FIGURE 3 is a central section; and
FIGURE 4 is a schematic view of the piping.

FIGURE 1 is a plan view of an aquatic pond embodying the principle of the invention, the particular pond illustrated being a bit over fifty feet wide and two hundred feet long, surrounded by a six foot gravel walk 10 and of a depth so that with the normal slope of the sides there will be a depth of say six feet so that the actual depth of the water can readily be the desired four feet, as controlled by a wier which is the top of a vertical pipe 12 surrounded by the usual wire box screen and leading to the horizontal discharge pipe 14 leading to a sump 15. The bottom 11 of the pond is quite level and the slope of the sides is preferably a rise of six feet in nine feet horizontal. The inlet to the pond is at 16 and may be of any desired type, in practice being a horizontal pipe with its axis about in line with the water level in the pond. In FIGURE 1 the circulators 20 are shown as four in number, each discharging in a manner so that all four cause a current to flow in a clockwise direction. Obviously a smaller or a greater number of circulators can be employed.

Each of the circulators, numbered generally 20, consists of a concrete slab 21 with its upper surface flush with the bottom 11 of the pond, the latter not only being even but free of holes or sludge pockets. The base 21 is required to be of considerable weight and strength as there is a tremendous uplift of the hood which is anchored to the base 21 by four steel legs 26 imbedded or otherwise secured to the concrete base 21. The sheet metal hood includes a front 27, two sides 28 and a curved rear wall 30, struck on an arc having its center at or near the top of the front legs 26.

The curved rear wall 30 may continue beyond the front wall 27 of the hood but I much prefer to make this tangent portion vertically adjustable and to this end I mount a flap 33 so that it may be a continuation of the substantially horizontal portion 31 of the rear wall 30 and pivot the flap as at 34 to the side walls 28 preferably through a down-turned flange 35 at each side of the flap. It will be noted particularly from FIGURE 2 that the height of front wall 27 is appreciably short of the top of rear wall 30, leaving a space 37 of the width of the hood and of a less vertical depth to readily carry the desired quantity of water which may be discharged from the hood. This, of course, depends upon the speed at which the water is discharged, my preference being about a foot per second, but the discharge may be as little as five inches per second or as great as eighteen inches per second.

The flow of water through the hood is caused by a discharge of air under pressure from one or more porous air diffuser tubes 40, here shown as three in number for each circulator and aerator. My preference is to use this number of three inch diffuser tubes with an outside diameter of four inches and a porosity of about 40 and to position the three tubes of each circulator transversely of the hood as best seen in FIGURE 3. The diffusers are mounted on supports 41 which may be T irons or anl other suitable supporting means.

It is my preference to have an independent control for each of the air diffuser tubes 40 and to this end I mount a blower 45 at any convenient location, on the shore of the pond or away from it, and provide the main air line 46 with a valve 47 to control simultaneously all diffuser tubes and also to provide separate valves 48 in each of the branch lines 49, each controlling individually its own diffuser tube. The main air pipe need be only of 1½" inside diameter in a pond of this size as that will take care of three branch pipes 49, each of an inch diameter. The pressure of air is such as to move a thousand gallons per minute in each of the hoods, the discharge being just about in line with the top surface in the pond as determined by the wier 20.

The flap 33 which can be secured in any desired adjusted position is normally tilted very slightly upward as best seen in FIGURE 3 as this slight upward tilting of the adjustable flap assists the air in escaping while amply affording complete dissolving of the foam which is becoming more and more prevalent in sewage plants due to the greater increased use of detergents. It is believed that the foam is caused in part by a new kind of bacteria which thrives in the particular environment newly created by the detergents. It would seem that this form of bacteria produces sugar and it has been noted that the more purified the sewage, as received in the pond from the secondary treatment, the greater the quantity of the foam formed. Without the present foam-eliminating circulator and aerator the highly cohesive foam is blown from the top of the pond like a cloud and may travel a distance as great as a mile before it sticks to a tree or other object. This obviously is highly objectionable and a main feature of the circulator is to eliminate completely the danger of having any foam on the surface of the pond. Fortunately the foam is highly soluble in water, provided that it is brought into very intimate contact. That the foam is completely dissolved, as the water passes through the hood and is deflected to a horizontal direction by the curved rear wall 30 and the adjustable flap 33, is obvious from the difference in tint of the water on the discharge side of the hood from the color at the rear of the hood.

One great advantage in the present system is that by having the hood spaced above the bottom of the pond six inches or so the water passes horizontally over the bed of the pond and carries with it not only the traces of sludge but also certain bacteria which grow at the bottom of the pond but not at or near the top of the pond. At the top of other ponds, however, there is frequently a scum of green algae which is very harmful from the public relations standpoint although having no other effect. For some reason the two different types of algae are not compatible and the bringing of the bottom organisms up to the top eliminates the green scum entirely, and consequently the aquatic pond can be made to be an asset to the community by stocking it with fish, lilies, etc., as a normal recreational clear water artificial lake.

It should be borne in mind that the tertiary treatment pond of the present invention is quite different from an oxidation pond or lagoon. These latter receive sewage which has been only partially treated, whereas the pond of the present invention receives sewage which has received what is generally called a "complete treatment." In such a treatment the raw sewage is first given a primary treatment for the purpose of removing settleable solids by physical means although almost invariably there is some biochemical reduction in such a primary treatment unit. The sewage from the primary treatment is then given a biological second treatment and while there is some settling of the solids, the general purpose of the secondary treatment is to remove organic matter from the sewage principally by means of bacteria and microscopic animals. The tertiary treatment completely eliminates esthetic objections to sewage lagoons because when the pond is stocked with vegetation and fish of various kinds, including both predatory fish and others, it has all the appearances of a healthy, clean pond of water.

While I have described a particular small installation, the pond in other cases has been of a shape conforming to the topography. In the larger tertiary ponds I preferably have two or more water intakes leading to the pump and I increase the number of circulators and aerators and alter their respective locations to insure that the circulation of water extends to all parts of the pond. In a pond 160 feet by 600 feet, for example, I use three discharge pipes and only six circulators, each discharging a thousand gallons per minute. When using a plurality of vertical discharge pipes, only the final pipe (the one most distant from the influent) is the wier and a wooden cover carrying the usual mesh cap screen rests upon the top of the emergency discharge pipe or pipes but these covers can float to prevent flooding of the pond should the water level rise because of any interference with flow through the wier, such as blocking of the wier screen by leaves during the autumn.

What I claim is:

1. A sewage treatment pond of roughly symmetrical shape in plan with its length greater than its width and having, a level earth bed, a pipe roughly midway between the two long sides for admitting sewage having had both primary and secondary sewage treatment, a sump, a discharge pipe communicating with the sump near one end thereof and having a vertical pipe rising therefrom to form a wier to determine the liquid level in the pond, a plurality of means on each of the two opposite sides of the discharge pipe discharging air-laden water in an endless path roughly midway between the discharge pipe and the proximate long side of the pond, said means each having an adjustable member to direct the air-laden water from beneath the water level to cross the water level, said means being spaced from each other so that the flow in the endless closed path will be substantially uniform and will follow the shore line of the pond.

2. The pond of claim 1 in which each of the means draws water from within six inches of the bottom of the pond and includes a plurality of air diffuser means as the propelling force for discharging the air-laden water at a speed sufficient to dissolve foam particles.

3. In a tertiary treatment system receiving sewage of the type in which 95% of the organic solids have been removed, the combination of a pond having a level earth bottom, means for discharging air at spaced locations around the perimeter of the pond and close to the earth bottom to raise the water surface, means for deflecting the pond water so raised to form a closed circulating path near the margin of the pond, said last means including a deflector for discharging the water about in line with the top surface of the pond so as to dissolve foam, each deflector being adjustable so that the discharge may be made to cross the pond water level, the air discharging means includes a plurality of parallel air diffuser tubes located less than six inches above the level of the bottom of the pond and providing a flow of water between five and eighteen inches per second, and the deflector includes a base embedded in the pond with its upper surface flush with the pond bottom.

References Cited in the file of this patent

UNITED STATES PATENTS

| | | |
|---|---|---|
| 298,101 | Leeds | May 6, 1884 |
| 750,474 | Monjeau | Jan. 26, 1904 |
| 1,180,089 | Thompson et al. | Apr. 18, 1916 |
| 1,643,273 | Imhoff | Sept. 20, 1927 |
| 1,867,512 | Kusch | July 12, 1932 |
| 1,867,824 | Hammerly | July 19, 1932 |
| 1,936,308 | Mueller | Nov. 21, 1933 |
| 1,937,434 | Piatt | Nov. 28, 1933 |
| 2,359,025 | Durdin | Sept. 26, 1944 |

FOREIGN PATENTS

| | | |
|---|---|---|
| 729 | Great Britain | 1914 |
| 561,395 | Germany | Feb. 22, 1933 |

OTHER REFERENCES

Bulletin 183, Chicago Pump Co., 2300 Walfrom St., Chicago, Ill., January 1940.